Patented May 14, 1935

2,001,525

UNITED STATES PATENT OFFICE 2,001,525

RESINOUS AND VARNISH COMPOSITION AND PROCESS FOR PREPARATION THEREOF

Roy E. Coleman, Meriden, Conn., assignor to General Electric Company, a corporation of New York No Drawing. Application October 27, 1932, Serial No. 639,847

2 Claims. (Cl. 134—26)

The present invention relates to resinous and varnish compositions and to processes for the preparation thereof. It is more particularly concerned with the production of novel compositions adapted for use in the manufacture of paints, varnishes and lacquers as well as for use in the molding and plastic industry in general.

It has heretofore been customary in the preparation of resinous and varnish compositions embodying synthetic resins and oils to so treat the synthetic resins as to make them compatible with the oils. The incorporation of untreated oils with synthetic resins is known to add valuable properties to the resulting compositions. The pretreatment of resins so as to make them compatible with oils hence is desirable. The resulting products gain in flexibility, toughness, water, and weather resistance to a great degree giving paint and varnish compositions of improved quality.

In accordance with my discovery I have found that still further improvements can be imparted to such oil-resin compositions if certain treatments are imparted to the oils themselves prior to combination with the resins rather than treating the resins themselves, without prior treatment of the oils. My discovery makes it possible to obtain final products wherein the oil character of the oil itself is retained as well as material improvements in water and weather resistance, flexibility and toughness. By means of my invention substantially large amounts of organic acid such as rosin or drying oil fatty acids may be incorporated with the synthetic resins enabling more ready solution of resins which are normally insoluble or difficultly soluble in oil.

Generally speaking, my invention in one of its aspects comprises a process wherein oils, such as China wood oil, soya bean oil, cottonseed oil, corn oil, poppy seed oil, hempseed oil, linseed oil and similar vegetable oils, fish oils, wool oil, lard oil, and similar animal oils are treated with a quantity of metallic base, for example, a metallic oxide, hydroxide, etc. so as to produce a metallic soap insoluble in the oil. An organic acid such as rosin or suitable fatty acid is added to the mixture of oil and insoluble soap to redissolve or effect solution of the separated normally insoluble metallic soaps. Heat treatment with or without the addition of driers then is effected to obtain the desired properties in the final product. In certain cases the process is carried on with the addition of glycerine so as to produce mono- or di-glycerides of the oil or rosin glycerine ester.

Synthetic resins compatible with the oils as treated are next introduced. As examples of such resins may be mentioned oil-soluble phenolic resins such as resins of the phenol-formaldehyde type which have been prepared in the presence of rosin or fatty acids or otherwise to render them oil-soluble; resins of the alkyd type, especially oil modified and fatty acid modified type of alkyd resins, etc. The resins may be added directly to the previously treated oils as outlined above, or to the mixture of separated insoluble metallic soap and oil. In the latter case, for example, where a resin of the phenol-formaldehyde or alkyd type containing a substantial amount of rosin or fatty acid is used, the free rosin or fatty acid is employed as a solvent for the soaps so as to effect their solution in the oil and also to accomplish introduction of the synthetic resin into the oil.

Another method of introducing resins into the oil is to process the oil as described above by heating so as to effect a substantial degree of colloidal formation in the oil, treating the product so formed with a suitable phenolic body, adding formaldehyde or paraformaldehyde in order to form a phenol-formaldehyde combination of the polymerized oil bodies soluble in the free rosin or fatty acid and the oil. Or, before the phenolic and aldehydic bodies are added as described in the foregoing sentence, the processed oil after being heated as aforestated is treated with a suitable alkali to increase its colloidal condition.

My invention as just outlined is particularly claimed in my copending application Serial No. 639,846, filed of even date herewith and assigned to the assignee of the present invention. The invention particularly claimed in the present case provides a different treatment of oils as compared with the foregoing treatments. In this aspect of my invention the oils are given what may be termed an acid treatment in contrast to the basic treatment heretofore described. The oil, for example China wood oil, or a mixture of oils, mentioned in the foregoing is first heated with boric acid or other suitable oil insoluble acids which permit polymerization of the oil and retard gelatinization, for example, oxalic acid, acetic acid, citric acid, etc. Boric acid is preferred from a practical standpoint for many reasons; for example, it is easy to handle and commercially readily available. It is also quite stable. Oil so treated is then heated at an elevated temperature so as to cause bodying (partial gelatinization) thereof. Oil so processed is characterized by its rapid drying properties and possesses exceptional water resistance. It allows the incorporation of a large amount of fatty acid in the product without detracting from the normal properties of a treated oil which are, for example, drying, adhesion and durability. The boric acid heated oils are fluid and when combined with certain resins give relatively fluid products which maintain their fluidity at normal temperatures for prolonged periods of time. This is important in that such products may be used as solventless varnishes. Moreover, in spite of their fluidity these varnishes are relatively quickly set up in film form.

In order to illustrate but not to limit my invention, the following descriptive examples will be given so that those skilled in the art to which the invention pertains may more easily practice the same.

EXAMPLE I

Formula

| | Percent |
|---|---|
| Rosin | 18.8 |
| Glycerol | 4.7 |
| Lime (hydrated) | 1.5 |
| Tung oil | 75.0 |

Procedure

Add the lime to cold tung oil in kettle and heat to 350° F. over a free flame, simultaneously stirring in the lime. Calcium tungate will appear in the oil during this period of raising the temperature, and, when the soaps are completely formed, will precipitate to the bottom. Add the rosin at this point and increase the temperature to 400° F. The calcium tungate should now be dissolved. Allow the temperature to fall to 350° F. and add the glycerol. Increase the temperature to 475° F. and hold at that point for say 45 minutes or when a pill of the varnish is clear on glass. Required time: usually 3½ to 4 hours.

This oil as treated above is now ready for incorporation with an oil soluble type phenolic resin. This oil will be referred to hereafter as lime—rosin treated oil.

Any oil soluble phenolic resin may be used. For example, a xylenol-paraformaldehyde oil-soluble resin produced by reacting these ingredients in a manner well known to those skilled in the art is typical of the resins which may be used.

One hundred parts by weight of the lime-rosin treated oil are heated to 300° F. and one hundred parts by weight oil-soluble phenolic resin are added. The temperature is increased to 400°–450° F. and held at this point for about fifteen minutes. The resin and oil blend completely.

The blend is thinned with two hundred parts by weight of mineral spirits or a mixture of mineral spirits, turpentine and toluol. The resulting varnish yields good films which air dry. The time of drying is dependent on the type of resin used. Baking will hasten the drying in all cases. The films are very tough and hard but do not chip or flake when metal carrying them is bent. The films are quite elastic in character. They are water resistant and withstand the action of boiling water for a comparatively long time.

EXAMPLE II 800 parts by weight China wood oil
16 parts by weight hydrated lime
200 parts by weight rosin
    16 parts by weight manganese resinate (or other suitable drier)

are treated in the manner outlined in the oil treatment set forth in Example I up to and including the addition of the resin. The glycerol is omitted. The drier is added when the soaps are completely dissolved by the rosin. The batch is then cooked thirty minutes at 450° F.

One hundred parts by weight of the above treated oil or varnish base are blended with twenty-five parts by weight of an oil soluble phenolic resin, for example a para-phenyl-phenol-aldehyde resin. The resin and oil blend easily and can be thinned with, say, one hundred twenty-five parts by weight of mineral spirits or other suitable thinners. This procedure gives a varnish which yields excellent films possessing the qualities outlined in Example I.

EXAMPLE III

The procedure of Example II is followed using for the resin a rosin modified phenol-formaldehyde resin.

EXAMPLE IV

Six hundred parts by weight phenol and two hundred ten parts by weight of fatty acid, for example linseed oil fatty acids are cooked together in a vessel fitted with reflux condenser for approximately twelve hours. Two hundred ten parts by weight paraformaldehyde are then added and boiling of the batch continued under reflux for about eight hours. The "A" stage is thus reached. By adding 25% by weight of rosin to the "A" stage and cooking in an open vessel to a stringy pill the "B" stage is reached.

One hundred parts by weight of lime-rosin treated oil (Example I or II) are heated to 300° F. and 37.5 parts by weight of a fatty acid modified phenolic resin ("B" stage) prepared as outlined above are added. The temperature must be raised slowly to 430° F. else excessive frothing sets in. The batch is cooled and one hundred thirty-seven parts by weight of a suitable thinner such as mineral spirits, or a mixture of mineral spirits, toluol and turpentine are added.

This varnish gives films which dry rapidly in air—a rather surprising result due to the quantity of fatty acid present. It adheres well to metallic surfaces and is water-resistant.

EXAMPLE V 250 parts by weight lime-rosin treated oil (Example I or II) and 63.5 parts by weight xylenol are heated together to 300° F. and held at this temperature for 10 minutes. 10.5 parts by weight paraformaldehyde and 0.7 part by weight oxalic acid are then added and the temperature allowed to fall to 250° F. due to excessive foaming. The temperature is thereafter gradually increased to 400° F. over a period of 40 minutes and finally dropped to 350° F. The batch is thinned with 300 parts by weight of mineral spirits.

This varnish yields a very hard film on metal surfaces. It is an air drying varnish with the addition of suitable driers. The films are elastic in character.

EXAMPLE VI

Equal parts by weight of a glycerol-phthalate resin and the distilled fatty acids of linseed oil are blended together, for example, by a simple cooking operation.

Lime-rosin treated oil (Example I or II) is then added to the blend. Various proportions may be employed, for example, 10 parts by weight of the blend to 90 parts by weight of the oil; 75 parts of the blend to 25 parts by weight of the oil, or various proportions in between these limits.

The incorporation of the blend with the oil is effected in the cold or at warm temperatures, say below 250° F.

This varnish yields excellent films on various surfaces. It is adhesive to metal and is air-drying.

EXAMPLE VII

Boric acid treatment of oils 100 parts by weight China wood oil
10 parts by weight boric acid Heat the oil to 310° F. Add $H_3BO_3$ (boric acid) slowly with constant stirring. Hold at 310° F. for 7 hours or until the separated boric acid mass turns dark and the batch ceases to boil.

This is the so-called long treatment of the oil and gives an oil which can be cooked longer at temperatures between 300-400° F. than the so-called short treatment of the oil which is described below:

100 parts by weight China wood oil
10 parts by weight boric acid

Raise temperature of oil to 250° F. Add the boric acid and stir thoroughly. Keep the boric acid well off the bottom of the kettle. When foaming has subsided (about 15 minutes) raise temperature to 350° F. and hold at this temperature until the combination of the boric acid and oil is precipitated to the bottom of the kettle as a gummy mass which is hard when cold. This requires from ½ to ¾ hour after the temperature has reached 350° F. The clear oil is then dipped to another kettle leaving the separated mass behind. The oil is then raised to 450° F. and maintained at this temperature for ½ to ¾ hour for proper body. The pill should be stringy and slightly gelatinous. A small proportion of fatty acid, for example, 10% by weight of the oil, may be added at this point in order to regulate more readily the bodying thereof when cooked with synthetic resins.

Both in the long cook and short cook procedures the proportions of oil to acid may be varied. For instance, the boric acid proportion may be anywhere from 2 to 10% of the oil used depending upon the results desired.

100 parts by weight of the boric acid treated oil, either the so-called long or short treated oil, depending on the character of the product desired, are heated to about 300° F. 28 parts by weight of an oil soluble resin of the phenolic type are added and the temperature is increased to 450° F. In order to body the oil. This bodying time can run from about ½ hour to about 45 minutes depending on the character of the resin. A suitable thinner, say mineral spirits, may be used to thin the varnish base. About 128 parts by weight of thinner is a suitable amount for use with the foregoing composition.

The proportions of oil to resin may be varied practically without limit. The time of cooking will, of course, vary with the proportions employed.

The varnish prepared in accordance with this treatment yields durable, hard films which adhere tenaciously to metals, which are water resistant and which are very flexible in character.

EXAMPLE VIII 250 parts by weight boric acid treated oil (long cook or short cook) and 63.5 parts by weight of a phenol, for example xylenol, are heated together at 350° F. for about 10 minutes. The temperature is then dropped to 250° F. and 10.5 parts by weight of paraformaldehyde are slowly added. The temperature is then increased to 450° F. and held at that point for approximately an hour after which the temperature is dropped to 350° F. and the batch thinned with mineral spirits.

The varnish gives good films but is rather slow air drying. By the addition of a small quantity of oxalic acid as in Example V the air drying properties of the product are improved.

EXAMPLE IX

A "B" stage fatty acid modified phenolic resin is prepared as in Example IV, and combined with the boric acid treated oil (long or short cook) after the manner specified in Example IV.

A good air-drying varnish results.

EXAMPLE X 100 parts by weight of glycerol-phthalate resin are cooked with 40 parts by weight of a fatty acid, for example linseed fatty acids, China wood fatty acids, castor acids, oleic acid, etc. at 350° F. for approximately 30 minutes or until a pill on glass remains clear. 40 parts by weight boric acid-tung oil varnish (long cook) are added and the temperature is increased to 450° F. and held at this point until a pill on glass remains clear and the proper body is obtained. The temperature is then dropped to 350° F. and a mixture of turpentine and mineral spirits added.

This varnish is very fast air-drying especially in the presence of driers and gives tough, elastic films adhering tenaciously to metals. This is also an excellent light colored baking varnish without the use of driers.

EXAMPLE XI 100 parts by weight glycerol phthalate resin
70 parts by weight fatty acids, for example, linseed fatty acids,
200 parts by weight boric acid treated (long cook) oil.

The resin and acid are cooked together first at 350° F. until a pill on glass remains clear. The oil is added and the temperature kept at 450° F. until the batch becomes clear and the proper body is obtained, i. e. when a pill on glass remains clear.

This varnish base can be thinned indefinitely with mineral spirits.

It yields films which are tough and more elastic in character than those obtained in Example VIII. Better water resistance is also obtained. The drying time is somewhat longer.

EXAMPLE XII 100 parts by weight glycerol phthalate resin
100 parts by weight fatty acids such as linseed fatty acids
1000 parts by weight boric acid treated (long cook) oil.

The same procedure is followed as in Example IX with the exception that the oil is added in small quantities instead of all at once.

This varnish base is thinned with mineral spirits; it has indefinite mineral spirit tolerance.

Films are obtained which show excellent adhesion to metal and improved water resistance.

EXAMPLE XIII

This example illustrates the use of a combined resin ingredient in the varnish.

A varnish base composition is first made as outlined in Example IX or X. 100 parts by weight of this varnish base is blended at 300° F. with 28 parts by weight of any suitable oil soluble phenolic resin. The temperature is thereafter increased to 450° F. and held until the desired body is attained.

The resulting composition is thinned with mineral spirits or other suitable thinners.

Films obtained are hard, tough and elastic.

The proportions of ingredients used may be varied over wide limits.

The foregoing examples are purely illustrative in character. It will be obvious to those skilled in the art that the invention illustrated by the examples given is neither limited to the specific ingredients named nor the proportions given therein. For instance, certain oil soluble phenolic and alkyd resins have been specifically named. It is obvious that any oil soluble resin may be employed in conjunction with the treated oils as set forth above. Furthermore, the proportions employed in the examples are purely illustrative proportions. Such variations in proportion of ingredients employed as are commonly resorted to in varnish making practice may be made. With the variation in proportion of the ingredients, changes in properties of the resulting compositions will be had. An increase in treated oil employed will result in an increase in the oil character of the varnish composition while an increase in the resin content thereof will result in an increase in the resin character of the composition. However, the resulting properties are not the purely additive properties of the ingredients. Markedly increased flexibility over similar compositions having untreated oil therein is obtained, for example, by increasing the oil character of the composition in accordance with my invention. Similarly, unusual hardness, toughness and adhesion is obtained with an increase in resin content. Certain proportions of ingredients will of course give the optimum results desired for the particular application in question.

With respect to the alkyd resins employed in carrying out my invention it is to be understood that glycerol phthalate or the fatty acid modified form thereof are merely typical of any of the alkyd resins which may be employed herein.

It is also apparent that in using the varnish compositions of my invention various pigments, dyes, fillers, etc. may be added. For the production of lacquers cellulose esters, such as nitrocellulose, cellulose acetate and the like may be used.

In making plastic compositions the usual fillers may be employed and the compositions molded either hot or cold as the case may require.

The varnish compositions of my invention are particularly useful as insulating varnishes; waterproof, acid and alkali resistant paints and varnishes; floor varnishes, exterior varnishes, enamels and quick drying house paints; metal primers and metal finishes; flat and semi-gloss finishes; baking varnishes and enamels, as well as for general uses in industry.

What I claim as new and desire to secure by Letters Patent of the United States, is:

1. The process of making a varnish composition which comprises heating China wood oil at an elevated temperature with about 2 to 10% by weight of boric acid, adding an oil-soluble synthetic resin of the class consisting of oil-soluble phenolic and alkyd resins, and continuing the heating until a homogeneous blend is obtained.

2. A varnish composition comprising the combination at an elevated temperature of an oil-soluble synthetic resin of the class consisting of oil-soluble phenolic and alkyd resins, and China wood oil heat treated at an elevated temperature with about 2 to 10% by weight of boric acid.

ROY E. COLEMAN.